US008801031B1

(12) United States Patent
Zucal (10) Patent No.: US 8,801,031 B1
(45) Date of Patent: Aug. 12, 2014

(54) INFLATABLE RESTRAINT DEPLOYMENT RAMP (71) Applicant: Nissan North America, Inc., Franklin, TN (US)

(72) Inventor: James Zucal, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/905,196

(22) Filed: May 30, 2013

(51) Int. Cl.
*B60R 21/213* (2011.01)
(52) U.S. Cl.
CPC .................................. *B60R 21/213* (2013.01)
USPC .................................. 280/730.2; 280/728.3
(58) Field of Classification Search
CPC ............ B60R 21/213; B60R 2021/161; B60R 21/232
USPC ............................................ 280/730.2, 728.3
See application file for complete search history.

(56) References Cited

U.S. PATENT DOCUMENTS

| 6,305,707 | B1 | 10/2001 | Ishiyama et al. |
| 7,641,227 | B2 | 1/2010 | Choi |
| 8,286,991 | B2 | 10/2012 | Shimazaki et al. |
| 2003/0090092 | A1* | 5/2003 | Salzle ........................ 280/730.2 |
| 2006/0119084 | A1* | 6/2006 | Coon et al. ................. 280/730.2 |
| 2006/0138750 | A1* | 6/2006 | Park ........................... 280/728.2 |
| 2007/0132217 | A1* | 6/2007 | Seong ........................ 280/730.2 |
| 2008/0106082 | A1* | 5/2008 | Choi ........................... 280/743.1 |

FOREIGN PATENT DOCUMENTS

| EP | 1 055 566 | 11/2000 |
| EP | 1 831 057 | 9/2007 |

* cited by examiner

*Primary Examiner* — Ruth Ilan
(74) *Attorney, Agent, or Firm* — Young, Basile, Hanlon & MacFarlane, P.C.

(57) ABSTRACT

An inflatable restraint assembly includes a curtain airbag module and a ramp assembly. The curtain airbag module has an inflatable curtain portion that is disposed in a stowed configuration prior to deployment and moves to a deployed configuration subsequent to deployment. The ramp assembly is located adjacent to the inflatable curtain portion of the curtain airbag module. The ramp assembly has a pivoting portion that is moveable from a closed position to an open position in response to deployment of the inflatable curtain portion, at least one separable retainer member that retains the pivoting portion in the closed position prior to deployment of the inflatable curtain portion, and a biasing structure that biases the pivoting portion of the ramp assembly toward the open position. The pivoting portion is configured to guide the inflatable curtain portion of the curtain airbag module during deployment of the inflatable curtain portion.

20 Claims, 6 Drawing Sheets

INFLATABLE RESTRAINT DEPLOYMENT RAMP

FIELD OF THE INVENTION

The disclosure relates to the field of inflatable restraints for automobiles.

BACKGROUND

Inflatable restraint devices commonly called airbags are standard equipment on most new vehicles. In early implementations of airbag systems, vehicles were equipped with one or more airbags that would deploy from forward-facing regions such as the steering wheel and the passenger side of the instrument panel. In more recent implementations, additional airbags have been employed in different areas of the vehicle. For example, side-curtain airbags have been utilized to provide enhanced energy dissipation capacity along the sides of vehicles. Side-curtain airbags have been employed in areas adjacent to the roof rail and headliner or the side doors. These airbag devices are typically concealed from occupant view prior to deployment by interior trim panels associated with the roof rail and/or headliner.

When an airbag is deployed, it is inflated with a gas, which pressurizes the airbag and induces surface tension in the material from which the airbag is fabricated. To ensure that the airbag deploys correctly, guide features are sometimes provided to allow the tensioned material to move in a desired manner with respect to adjacent vehicle structures, such as trim panels, structural pillars, windows, and seats.

SUMMARY

Inflatable restraint assemblies for use in vehicles are taught herein.

One aspect of the disclosed embodiments is an inflatable restraint assembly that includes a curtain airbag module and a ramp assembly. The curtain airbag module has an inflatable curtain portion that is disposed in a stowed configuration prior to deployment and moves to a deployed configuration subsequent to deployment. The ramp assembly is located adjacent to the inflatable curtain portion of the curtain airbag module. The ramp assembly has a pivoting portion that is moveable from a closed position to an open position in response to deployment of the inflatable curtain portion, at least one separable retainer member that retains the pivoting portion in the closed position prior to deployment of the inflatable curtain portion, and a biasing structure that biases the pivoting portion of the ramp assembly toward the open position. The pivoting portion is configured to guide the inflatable curtain portion of the curtain airbag module during deployment of the inflatable curtain portion.

Another aspect of the disclosed embodiments is an inflatable restraint assembly that includes a vehicle pillar, a pillar trim component, and a curtain airbag module. The pillar trim component is attached to the vehicle pillar and has an upper end and an inboard surface. The curtain airbag module is located adjacent to the upper end of the pillar trim component and has an inflatable curtain portion that is disposed in a stowed configuration prior to deployment and moves to a deployed configuration subsequent to deployment. The inflatable restraint assembly also includes a headliner that is located adjacent to the upper end of the pillar trim component and conceals the inflatable curtain portion of the curtain airbag module when the inflatable curtain portion is in the stowed configuration and is separated from the upper end of the pillar trim component when the inflatable curtain portion of the curtain airbag module is in the deployed configuration. The inflatable restraint assembly also includes a ramp assembly having a pivoting portion, a separable retainer portion, and a biasing structure. The pivoting portion is moveable from a closed position to an open position in response to deployment of the inflatable curtain portion. The separable retainer portion retains the pivoting portion in the closed position prior to deployment of the inflatable curtain portion. The biasing structure biases the ramp assembly toward the open position. The ramp assembly is configured to guide the inflatable curtain portion of the curtain airbag module past the inboard surface of the pillar trim component during deployment of the inflatable curtain portion.

Another aspect of the disclosed embodiments is an inflatable restraint assembly that includes a vehicle pillar, a pillar trim component, and a curtain airbag module. The pillar trim component is attached to the vehicle pillar and has an upper end and an inboard surface. The curtain airbag module is located adjacent to the upper end of the pillar trim component and has an inflatable curtain portion that is disposed in a stowed configuration prior to deployment and moves to a deployed configuration subsequent to deployment. The inflatable restraint assembly also includes a headliner that is located adjacent to the upper end of the pillar trim component and conceals the inflatable curtain portion of the curtain airbag module when the inflatable curtain portion is in the stowed configuration and is separated from the upper end of the pillar trim component when the inflatable curtain portion of the curtain airbag module is in the deployed configuration. The inflatable restraint assembly also includes a ramp assembly having a base portion, a pivoting portion, a connecting portion, a separable retainer portion, and a biasing structure. The pivoting portion is pivotally connected to the base portion by at least one hinge member and is moveable from a closed position to an open position in response to deployment of the inflatable curtain portion. The separable retainer portion retains the pivoting portion in the closed position in which the pivoting portion is connected to the connecting portion prior to deployment of the inflatable curtain portion. The biasing structure includes at least one spring that biases the ramp assembly toward the open position. The ramp assembly is configured to guide the inflatable curtain portion of the curtain airbag module past the inboard surface of the pillar trim component during deployment of the inflatable curtain portion.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
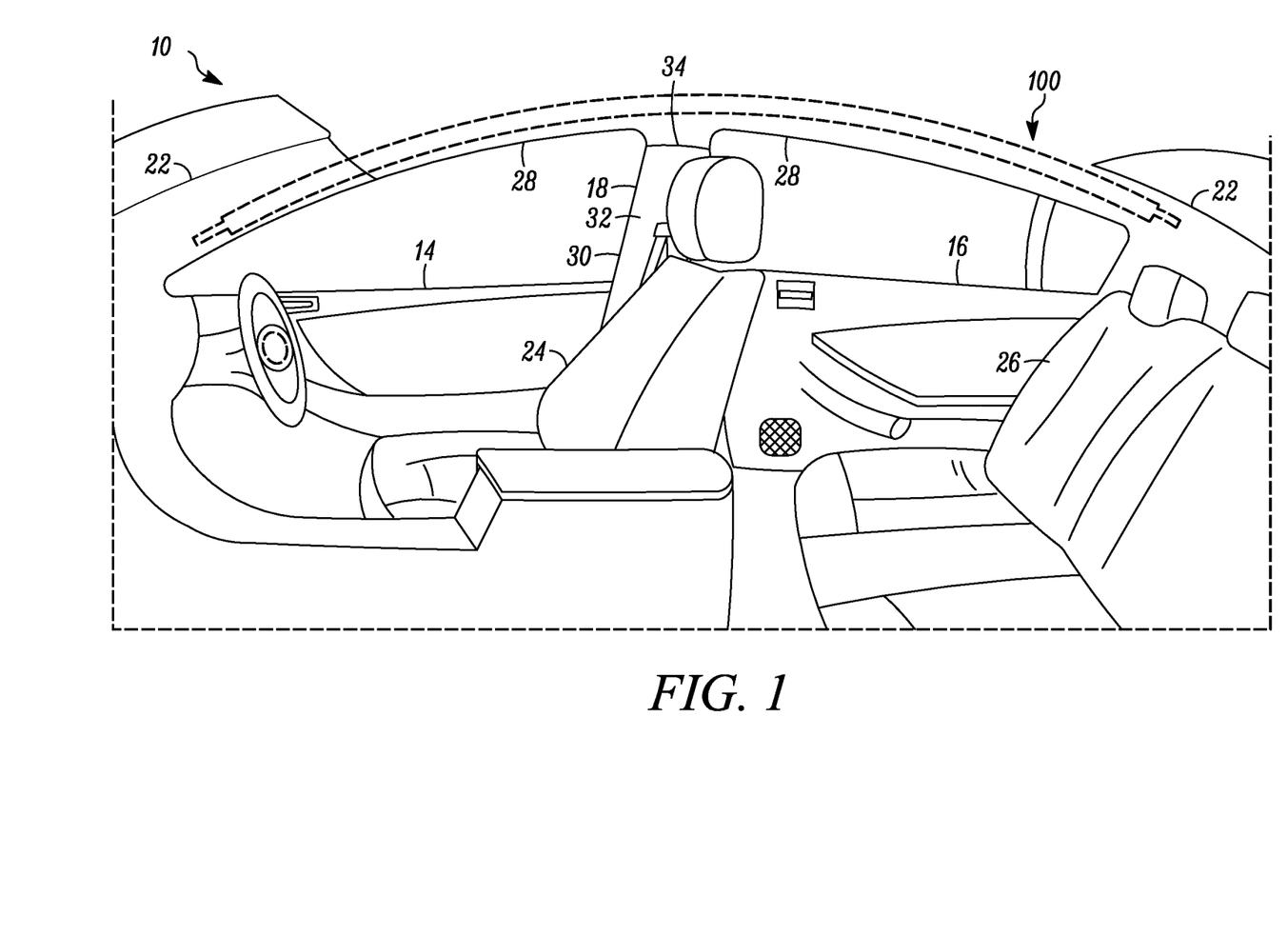
FIG. 1 is an illustration showing a vehicle equipped with a curtain airbag module.

FIG. 1 shows a vehicle 10 having a side impact restraint in the form of a curtain airbag module 100. The vehicle 10 may include a front door 14 and a rear door 16 that are separated from one another by an interior structural pillar or B-pillar 18 of the vehicle 10. A front structural pillar or A-pillar 20 is disposed forward of the front door 14. A rear structural pillar or C-pillar 22 is disposed rearward of the rear door 16. Front seats 24 are positioned adjacent to the front door 14, while rear seats 26 are positioned adjacent to the rear door 16. Of course, the vehicle 10 shown and described herein is not limiting of the invention, and the inflatable curtain 12 could be used with other vehicles 10, such as vehicles 10 that do not include a rear door 16 but include rear seats 26, or vehicles that lack both a rear door 16 and rear seats 26.

The curtain airbag module 100 includes one or more inflatable portions that are configured to inflate in response to rapid deceleration of the vehicle (e.g. during an impact event or other contact between the vehicle 10 and an exterior obstacle) to restrain motion of the occupants of the vehicle 10 with respect to the vehicle 10 and to dissipate energy from the force of the impact. The vehicle 10 can include sensors, controllers, and associated hardware (not shown) that sense an impact event and cause deployment of the one or more inflatable portions of the curtain airbag module 100.

Prior to deployment, the inflatable curtain 12 is disposed at least partially behind a headliner 28 of the vehicle 1, in a pre-deployment position of the inflatable curtain 12. The inflatable curtain 12 extends underneath the headliner 28 along the longitudinal direction of the vehicle 10, just above the front door 14 and the rear door 16 as well as the B-pillar 18. The inflatable curtain 12 may extend at least partially along the length of both the A-pillar 20 and the C-pillar 22 of the vehicle 10.

To provide a finished appearance for the B-pillar 18 on the interior of the vehicle 10, a pillar trim component 30, which may also be referred to herein as a trim panel, is connected to and extends about the B-pillar 18. An inboard surface 32 of the pillar trim component 30 is disposed laterally inward from the B-pillar 18, such that an upper end 34 of the pillar trim component 30 and the B-pillar 18 cooperate to define a stepped configuration. The upper end 34 of the pillar trim component 30 abuts the headliner 28 and is disposed adjacent to the inflatable curtain 12 when the inflatable curtain 12 is in the pre-deployment position.

Figure 2:
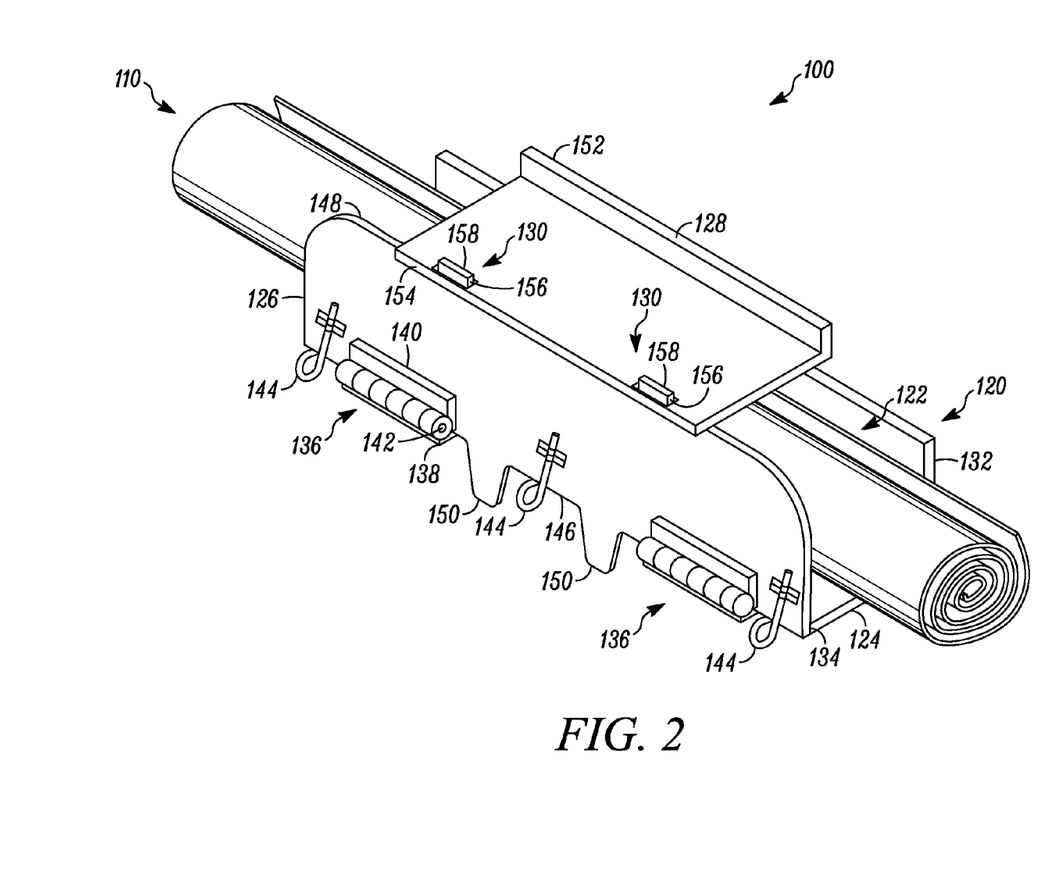
FIG. 2 is a perspective view showing an inflatable curtain portion of the curtain airbag module and a ramp assembly of the curtain airbag module.

FIG. 2 shows part of the curtain airbag module 100, including an inflatable curtain portion 110 and a ramp assembly 120. As will be explained further herein, the inflatable curtain portion 110 is disposed in a stowed configuration (FIGS. 2-3) prior to deployment and moves to a deployed configuration (FIG. 5) subsequent to deployment.

The ramp assembly 120 substantially surrounds the inflatable curtain portion 110 when the inflatable curtain portion 110 is in the stowed configuration, such that the inflatable curtain portion 110 passes through a channel 122 defined by the ramp assembly 120. The ramp assembly 120 can include a base portion 124, a pivoting portion 126, a connecting portion 128, and a separable retainer portion 130 that connects the pivoting portion 126 to the connecting portion 128 prior to deployment of the inflatable curtain portion 110 of the curtain airbag module 100.

The base portion 124 is adapted to be connected to a part of the vehicle 10 such as the B-pillar 18 (not shown in FIG. 2). For example, the base portion 124 can be connectable to the B-pillar 18 by conventional means such as welding or fasteners. The base portion 124 is configured to extend laterally inward from the B-pillar 18 of the vehicle 10 when mounted with respect to the vehicle 10, such that the base portion 124 extends toward the interior space of the vehicle 10. In the illustrated example, the base portion 124 is an L-shaped bracket including two portions that are substantially planar and extend roughly perpendicular to one another. However, it should be understood that the geometry of the base portion 124 is not critical and that other geometries can be utilized.

The base portion 124 can extend from an outboard end 132 to an inboard end 134. The base portion 124 is adapted to be connected to the B-pillar 18 at the outboard end 132 thereof. The base portion 124 is adapted to be pivotally connected to the pivoting portion 126 at the inboard end 134 thereof.

The pivoting portion 126 is pivotally connected to the base portion 124. As an example, the pivoting portion 126 can be connected to the base portion 124 by one or more hinge members 136. The hinge members 136 can be conventional hinges of any type that are connected to the base portion 124 and the pivoting portion 126 to allow pivotal motion of the pivoting portion 126 with respect to the base portion 124. In the illustrated example, the hinge member 136 includes a first hinge part 138 that is connected to the base portion 124, a second hinge part 140 that is connected to the pivoting portion 126, and a pin 142 that interconnects the first hinge part 138 and the second hinge part 140. The pin 142 defines a pivot axis about which the pivoting portion 126 pivots with respect to the base portion 124.

The pivoting portion 126 is adapted to pivot between a closed position and an open position with respect to the base portion 124. The ramp assembly 120 can include a biasing structure to bias the pivoting portion 126 toward the open position by exerting a biasing force upon the pivoting portion 126. As one example, the biasing structure can be or include one or more springs 144, such as torsion springs, that are connected to the base portion 124 and to the pivoting portion 126 to exert a biasing force upon the pivoting portion 126 that biases the pivoting portion 126 toward the open position. In another implementation of the biasing structure, the hinge member 136 is a spring hinge with internal biasing components that exert a biasing force upon the pivoting portion 126 to bias the pivoting portion 126 toward the open position. As another example, an elastic material can be connected to the pivoting portion 126 and the base portion 124 to urge the pivoting portion 126 toward the open position. Other implementations of the biasing structure are possible, and any suitable biasing structure can be utilized.

The pivoting portion 126 extends from a bottom end 146 to a top end 148. The bottom end 146 is positioned adjacent to the base portion 124 and can be connected to the hinge members 136. The top end 148 is positioned adjacent to the connecting portion 128 and can be in engagement with the connecting portion 128, as will be described further herein. Although any suitable geometry can be utilized for the pivoting portion 126, in the illustrated example, the pivoting portion 126 is a substantially planar member that can be made from any suitable material.

In order to limit a maximum degree of rotation of the pivoting portion 126 with respect to the base portion 124, one or both of the pivoting portion 126 and the base portion 124 can include a stop member. In the illustrated example, the pivoting portion 126 incorporates stop members in the form of tabs 150 that extend downward from the bottom end 146 of the base portion 124. Upon rotation of the pivoting portion 126 toward the open position thereof, the tabs 150 engage the base portion 124 when the pivoting portion 126 has reached a desired end limit of rotational travel with respect to the base portion 124 and thus has reached the open position thereof. It should be understood that the tabs 150 are provided as examples of stop members and that any suitable structure can be utilized as stop members so long as the maximum degree of rotation of the pivoting portion 126 with respect to the base portion 124 is restrained.

The connecting portion 128 is adapted to be connected to a portion of the vehicle 10, such as the B-pillar 18 of the vehicle 10. The connecting portion 128 is also adapted to be connected to the pivoting portion 126 when the pivoting portion 126 is in the closed position thereof prior to deployment of the inflatable curtain portion 110 of the curtain airbag module 100. The connecting portion 128 extends from an outboard end 152 to an inboard end 154. The outboard end 152 of the connecting portion 128 is connectable to the B-pillar 18 of the vehicle 10. The inboard end 154 of the connecting portion 128 is connectable to the pivoting portion 126, as will be explained herein. Although any suitable geometric configuration can be utilized for the connecting portion 128, the illustrated example shows a connecting portion 128 in the form of a substantially planar member that extends outward from the outboard end 152 thereof to the inboard end 154 thereof. Furthermore, while the connecting portion 128 is shown independently connected to the B-pillar 18, the connecting portion 128 can also be fixed to the inboard end 132 of the base portion 124 so that the ramp assembly 120 can be installed as a single module.

When the pivoting portion 126 is in the closed position, the connecting portion 128 is connected to the pivoting portion 126 by the separable retainer portion 130. The separable retainer portion 130 is a part of the ramp assembly 120 that is configured to connect the connecting portion 128 to the pivoting portion 126 while the inflatable curtain portion 110 of the curtain airbag module 100 is in the stowed configuration. The separable retainer portion 130 is configured to allow disconnection of the connecting portion 128 with respect to the pivoting portion 126 during deployment of the inflatable curtain portion 110 of the curtain airbag module 100. In some implementations, the separable retainer portion 130 can cause disconnection of the connecting portion 128 with respect to the pivoting portion 126 in response to forces exerted upon the connecting portion 128 and/or the pivoting portion 126 during inflation of the inflatable curtain portion 110 of the curtain airbag module 100, as will be explained in detail herein. In other implementations, an active release mechanism can be utilized as part of the separable retainer portion 130, such as a mechanical release mechanism or a pyrotechnic release mechanism that is triggered at the time of inflation of the inflatable curtain portion 110 of the curtain airbag module 100 in order to disconnect the pivoting portion 126 from the connecting portion 128 and thereby allow the pivoting portion 126 to move toward the open position. In the case of an active release mechanism that is incorporated as part of the separable retainer portion 130, such a mechanism can be triggered by the same sensors and controllers that trigger inflation of the inflatable curtain portion 110 of the curtain airbag module 100.

In the illustrated example, the separable retainer portion 130 is defined by structural features of the connecting portion 128 that interact with structural features of the pivoting portion 126 to prevent rotation of the pivoting portion 126 prior to inflation of the inflatable curtain portion 110 of the curtain airbag module 100. In particular, the separable retainer portion 130 can include apertures 156 that are formed through the connecting portion 128 adjacent to the inboard end 154 thereof. The separable retainer portion 130 can also include tabs 158 that are formed on the pivoting portion 126 at the top end 148 thereof and extend upward with respect to the top end 148. The tabs 158 are received within the apertures 156 prior to deployment of the inflatable curtain portion 110 of the curtain airbag module 100. Upon inflation of the inflatable curtain portion 110, the tabs 158 are dislodged from the apertures 156, such that engagement of the tabs 158 with the connecting portion 128 within the apertures 156 no longer restrains pivoting motion of the pivoting portion 126, and therefore, the pivoting portion 126 moves toward the open position by pivoting at the hinge member 136 under influence of the springs 144. It should be understood that other structures can be provided on the pivoting portion 126 and/or the connecting portion 128 that engage the other of the pivoting portion 126 or the connecting portion 128 in order to restrain motion of the pivoting portion 126, and thus, the separable retainer portion 130 can be provided using structures other than the apertures 156 and the tabs 158.

Figure 3:
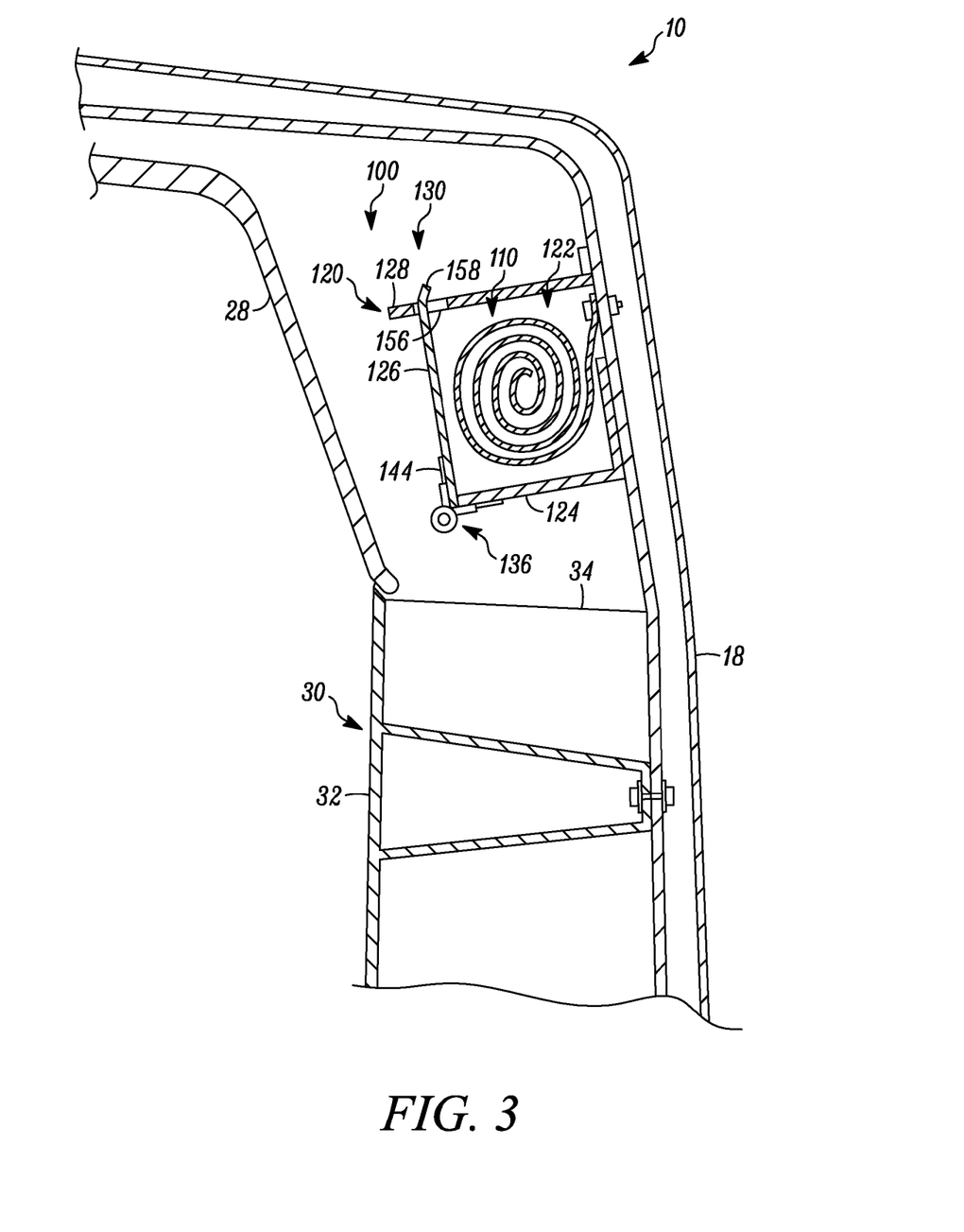
FIG. 3 is a rear sectional view of the vehicle of FIG. 1 showing the inflatable curtain portion of the curtain airbag module in a stowed configuration.

FIG. 3 is a sectional view of the vehicle 10, in which the inflatable curtain portion 110 of the curtain airbag module 100 is disposed in the stowed configuration. In the stowed configuration, at least part of the inflatable curtain portion 110 extends through the channel 122 that is defined by the ramp assembly 120. While the inflatable curtain portion 110 remains in the stowed configuration, the pivoting portion 126 of the ramp assembly 120 is in the closed position thereof, with the separable retainer portion 130 connecting the pivoting portion 126 to the connecting portion 128. In the illustrated example, the separable retainer portion 130 connects the pivoting portion 126 to the connecting portion 128 by means of a first part that is formed on the connecting portion 128, namely the aperture 156, and via a second part that is formed on the pivoting portion 126, namely the tab 158. Prior to deployment of the inflatable curtain portion 110 of the curtain airbag module 100, the headliner 28 is located adjacent to the upper end of the pillar trim component 30 and is in engagement with the upper end 34 of the pillar trim component 30. Thus, the headliner 28 conceals the inflatable curtain portion 110 of the curtain airbag module 100 from view by passengers within the passenger compartment of the vehicle 10 while the inflatable curtain portion 110 remains in the stowed configuration.

Figure 4:
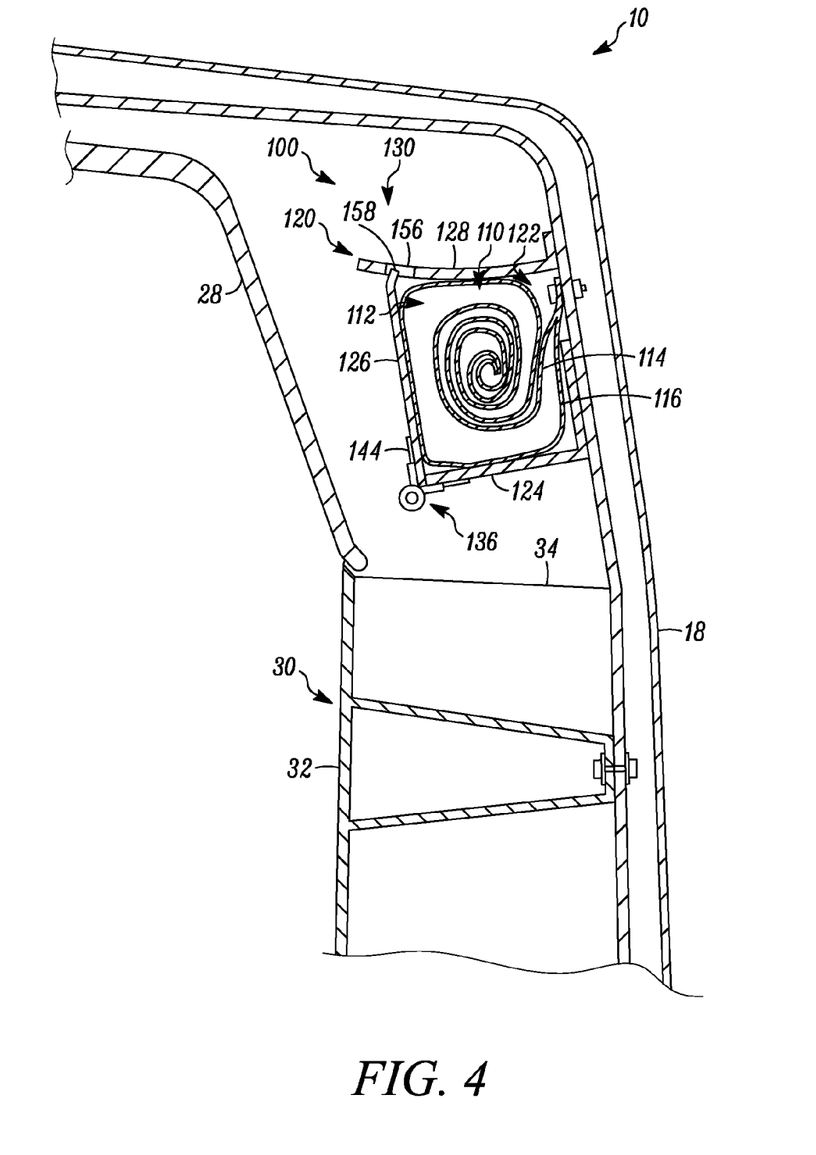
FIG. 4 is a rear sectional view of the vehicle of FIG. 1 showing the inflatable curtain portion of the curtain airbag module during deployment.

Upon activation of the curtain airbag module 100, an inflation gas is delivered to the inflatable curtain portion 110, to cause inflation of the inflatable curtain portion 110, as shown in FIG. 4. In particular, the inflation gas is delivered to an internal volume 112 of the inflatable curtain portion 110, where the internal volume 112 is located between an outer panel 114 of the inflatable curtain portion 110 and an inner panel 116 of the inflatable curtain portion 110. As the inflatable curtain portion 110 inflates, it fills the channel 122 that is defined by the ramp assembly 120 and engages one or both of the pivoting portion 126 and the connecting portion 128. In the illustrated example, the pressure exerted upon the connecting portion 128 by the inflatable curtain portion 110 causes deflection of the connecting portion 128, thereby moving the connecting portion 128 such that the tab 158 of the pivoting portion 126 moves out of the aperture 156 of the connecting portion 128 to cause separation of the separable retainer portion 130. In implementations where other structures are used as the separable retainer portion 130, deflection of the connecting portion 128 and/or the pivoting portion 126 can likewise cause separation of the separable retainer portion 130.

Figure 5:
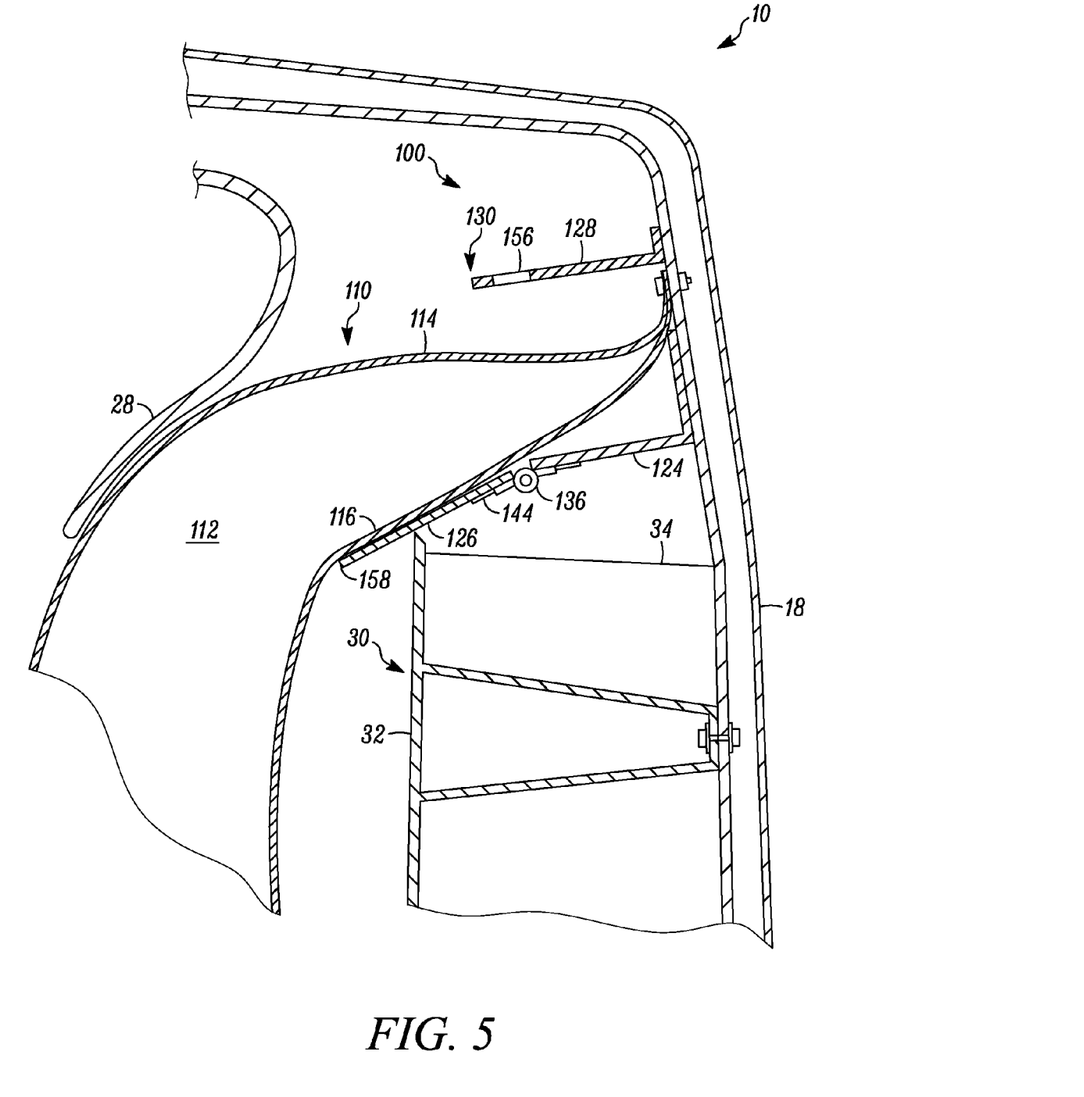
FIG. 5 is a rear sectional view of the vehicle of FIG. 1 showing the inflatable curtain portion of the curtain airbag module in a deployed configuration.

As shown in FIG. 5, subsequent to separation of the separable retainer portion 130, the biasing force exerted on the pivoting portion 126, in combination with the force exerted on the pivoting portion 126 by expansion of the inflatable curtain portion 110, causes the pivoting portion 126 to move from the closed position to the open position. As the pivoting portion 126 moves toward the open position, the pivoting portion 126 and/or the inflatable curtain portion 110 can engage the headliner 28 to separate the headliner 28 from engagement with respect to the pillar trim component 30. Once the headliner 28 is separated from the pillar trim component 30, the pivoting portion 126 guides the inflatable curtain portion 110 past the inboard surface 32 of the pillar trim component 30 by way of interposition of the pivoting portion 126 of the ramp assembly 120 between the inflatable curtain portion 110 and the pillar trim component 30. Because the pivoting portion 126 extends from the base portion 124 of the ramp assembly 120 to a location that is inboard with respect to the inboard surface 32 of the pillar trim component 30, the inflatable curtain portion 110 is guided past the pillar trim component 30 such that the inflatable curtain portion 110 does not engage the upper end 34 of the pillar trim component 30 during deployment.

Figure 6:
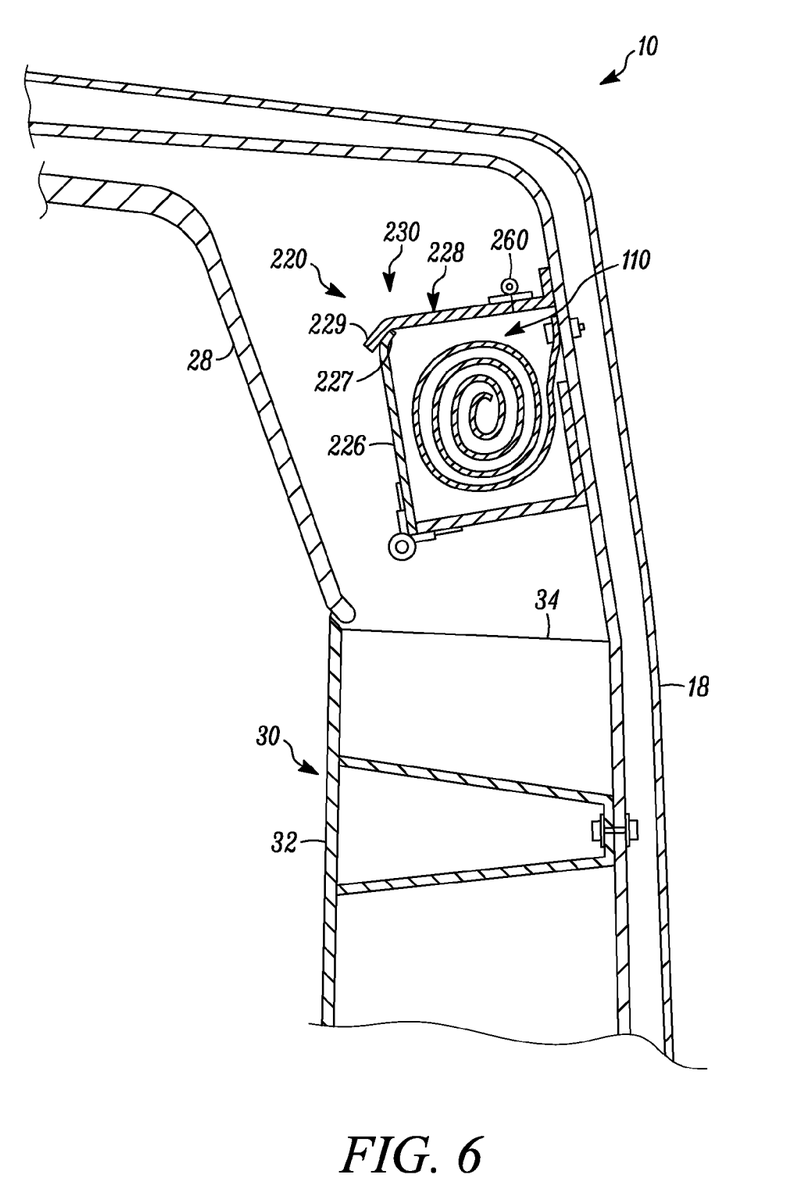
FIG. 6 is a rear sectional view of the vehicle of FIG. 1 showing a curtain airbag module having an alternative ramp assembly.

As shown in FIG. 6, alternative structures can be provided as the separable retainer portion 130. As an example, an alternative ramp assembly 220 can include a separable retainer portion 230 in which a downwardly directed flange 229 of a connecting portion 228 overlies a complementarily angled end part 227 of a pivoting portion 226 in order to restrain movement of the pivoting portion 226 with respect to the connecting portion 228 prior to inflation of the inflatable curtain portion 110. The connecting portion 228 can incorporate a hinge member 260 to allow pivoting of at least part of the connecting portion 228. The connecting portion 228 can also include a biasing element such as by providing a spring hinge as the hinge member 260, such that the connecting portion 228 is biased into engagement with the pivoting portion 226, to retain the pivoting portion 226 in the closed position until deployment of the inflatable curtain portion 110. The connecting portion 228 can further include a stop member that limits the maximum degree of rotation of the connecting portion 228 at the hinge member 260. As an example, a structure similar to the tabs 150 can be utilized. Portions of the alternative ramp assembly 220 that are not explicitly described herein are identical to those described in connection with the ramp assembly 120, and operation of the alternative ramp assembly 220 is identical to operation of the ramp assembly 120, except as otherwise described herein.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An inflatable restraint assembly, comprising:
 a curtain airbag module having an inflatable curtain portion that is disposed in a stowed configuration prior to deployment and moves to a deployed configuration subsequent to deployment; and
 a ramp assembly that is located adjacent to the inflatable curtain portion of the curtain airbag module, the ramp assembly having a pivoting portion that is moveable from a closed position to an open position in response to deployment of the inflatable curtain portion, at least one separable retainer member that retains the pivoting portion in the closed position prior to deployment of the inflatable curtain portion, and a biasing structure that biases the pivoting portion of the ramp assembly toward the open position, wherein the pivoting portion of the ramp assembly is configured to guide the inflatable curtain portion of the curtain airbag module during deployment of the inflatable curtain portion.

2. The inflatable restraint assembly of claim 1, wherein the ramp assembly includes a base portion and the pivoting portion of the ramp assembly is pivotally connected to the base portion by at least one hinge member.

3. The inflatable restraint assembly of claim 2, wherein the at least one hinge member includes a pin that defines a pivot axis for the pivoting portion of the ramp assembly.

4. The inflatable restraint assembly of claim 2, wherein the pivoting portion of the ramp assembly includes a stop member that contacts the base portion to limit a maximum degree of rotation of the pivoting portion as the pivoting portion moves toward the open position.

5. The inflatable restraint assembly of claim 1, wherein the ramp assembly includes a connecting portion, wherein at least a part of the pivoting portion is positioned adjacent to the connecting portion when the pivoting portion is in the closed position and the pivoting portion moves away from the connecting portion as the pivoting portion moves from the closed position toward the open position.

6. The inflatable restraint assembly of claim 5, wherein the at least one separable retainer member connects the pivoting portion of the ramp assembly to the connecting portion of the ramp assembly prior to deployment of the inflatable curtain portion of the curtain airbag module.

7. The inflatable restraint assembly of claim 5, wherein the at least one separable retainer has a first part that is defined by the pivoting portion of the ramp assembly and a second part that is defined by the connecting portion of the ramp assembly.

8. The inflatable restraint assembly of claim 5, wherein the separable retainer member includes a slot and a tab that is retained within the slot when the pivoting portion of the ramp assembly is in the closed position, wherein the slot is formed on one of the pivoting portion of the ramp assembly or the connecting portion of the ramp assembly and the tab is formed on the other of the pivoting portion of the ramp assembly or the connecting portion of the ramp assembly.

9. The inflatable restraint assembly of claim 5, wherein the ramp assembly includes a base portion, the pivoting portion of the ramp assembly is pivotally connected to the base portion, and the pivoting portion of the ramp assembly, the base portion of the ramp assembly, and the connecting portion of the ramp assembly cooperate to define a channel having at least part of the inflatable curtain portion of the curtain airbag module disposed therein prior to deployment of the inflatable curtain portion of the curtain airbag module.

10. The inflatable restraint assembly of claim 1, further comprising:
 a vehicle pillar, wherein the ramp assembly is connected to the vehicle pillar.

11. The inflatable restraint assembly of claim 10, further comprising:
 a pillar trim component that is attached to the vehicle pillar, the pillar trim component having an upper end, wherein the upper end of the pillar trim component is positioned adjacent to the ramp assembly and the inflatable curtain portion of the curtain airbag module.

12. The inflatable restraint assembly of claim 11, wherein the pivoting portion of the ramp assembly is configured to guide the inflatable curtain portion of the curtain airbag module past the pillar trim component during deployment of the inflatable curtain portion.

13. The inflatable restraint assembly of claim 11, wherein the pivoting portion of the ramp assembly is interposed between the inflatable curtain portion of the curtain airbag module and the upper end of the pillar trim component during deployment of the inflatable curtain portion of the curtain airbag module.

14. An inflatable restraint assembly, comprising:
a vehicle pillar;
a pillar trim component that is attached to the vehicle pillar, the pillar trim component having an upper end and an inboard surface;
a curtain airbag module that is located adjacent to the upper end of the pillar trim component, the curtain airbag module having an inflatable curtain portion that is disposed in a stowed configuration prior to deployment and moves to a deployed configuration subsequent to deployment;
a headliner that is located adjacent to the upper end of the pillar trim component and conceals the inflatable curtain portion of the curtain airbag module when the inflatable curtain portion is in the stowed configuration and is separated from the upper end of the pillar trim component when the inflatable curtain portion of the curtain airbag module is in the deployed configuration; and
a ramp assembly having a pivoting portion that is moveable from a closed position to an open position in response to deployment of the inflatable curtain portion, a separable retainer portion that retains the pivoting portion in the closed position prior to deployment of the inflatable curtain portion, and a biasing structure that biases the ramp assembly toward the open position, wherein the ramp assembly is configured to guide the inflatable curtain portion of the curtain airbag module past the inboard surface of the pillar trim component during deployment of the inflatable curtain portion.

15. The inflatable restraint assembly of claim 14, wherein the ramp assembly includes a base portion and the pivoting portion of the ramp assembly is pivotally connected to the base portion by at least one hinge member.

16. The inflatable restraint assembly of claim 15, wherein the pivoting portion of the ramp assembly includes a stop member that contacts the base portion to limit a maximum degree of rotation of the pivoting portion as the pivoting portion moves toward the open position.

17. The inflatable restraint assembly of claim 14, wherein the ramp assembly includes a connecting portion, wherein at least a part of the pivoting portion is positioned adjacent to the connecting portion when the pivoting portion is in the closed position and the pivoting portion moves away from the connecting portion as the pivoting portion moves from the closed position toward the open position.

18. The inflatable restraint assembly of claim 17, wherein the at least one separable retainer member connects the pivoting portion of the ramp assembly to the connecting portion of the ramp assembly prior to deployment of the inflatable curtain portion of the curtain airbag module.

19. The inflatable restraint assembly of claim 17, wherein the ramp assembly includes a base portion, the pivoting portion of the ramp assembly is pivotally connected to the base portion, and the pivoting portion of the ramp assembly, the base portion of the ramp assembly, and the connecting portion of the ramp assembly cooperate to define a channel having at least part of the inflatable curtain portion of the curtain airbag module disposed therein prior to deployment of the inflatable curtain portion of the curtain airbag module.

20. An inflatable restraint assembly, comprising:
a vehicle pillar;
a pillar trim component that is attached to the vehicle pillar, the pillar trim component having an upper end and an inboard surface;
a curtain airbag module that is located adjacent to the upper end of the pillar trim component, the curtain airbag module having an inflatable curtain portion that is disposed in a stowed configuration prior to deployment and moves to a deployed configuration subsequent to deployment;
a headliner that is located adjacent to the upper end of the pillar trim component and conceals the inflatable curtain portion of the curtain airbag module when the inflatable curtain portion is in the stowed configuration and is separated from the upper end of the pillar trim component when the inflatable curtain portion of the curtain airbag module is in the deployed configuration; and
a ramp assembly having a base portion, a pivoting portion that is pivotally connected to the base portion by at least one hinge member and is moveable from a closed position to an open position in response to deployment of the inflatable curtain portion, a connecting portion, a separable retainer portion that retains the pivoting portion in the closed position in which the pivoting portion is connected to the connecting portion prior to deployment of the inflatable curtain portion, and a biasing structure including at least one spring that biases the ramp assembly toward the open position, wherein the ramp assembly is configured to guide the inflatable curtain portion of the curtain airbag module past the inboard surface of the pillar trim component during deployment of the inflatable curtain portion.

* * * * *